(12) United States Patent
Kume

(10) Patent No.: US 7,872,677 B2
(45) Date of Patent: Jan. 18, 2011

(54) SOLID-STATE IMAGING APPARATUS

(75) Inventor: Atsuko Kume, Tokyo (JP)

(73) Assignee: Olympus Corporation, Tokyo (JP)

( * ) Notice: Subject to any disclaimer, the term of this patent is extended or adjusted under 35 U.S.C. 154(b) by 628 days.

(21) Appl. No.: 11/939,045

(22) Filed: Nov. 13, 2007

(65) Prior Publication Data

US 2008/0112016 A1 May 15, 2008

(30) Foreign Application Priority Data

Nov. 14, 2006 (JP) .............................. 2006-307693

(51) Int. Cl.
- H04N 9/64 (2006.01)
- H04N 5/217 (2006.01)
- H04N 5/14 (2006.01)
- H01L 27/00 (2006.01)
- G01T 1/24 (2006.01)

(52) U.S. Cl. ....................... 348/243; 348/241; 348/308; 348/302; 250/208.1; 358/462

(58) Field of Classification Search ................. 348/241, 348/302–310, 243, 248; 250/208.1, 370.08; 358/462

See application file for complete search history.

(56) References Cited

U.S. PATENT DOCUMENTS

| | | | | |
|---|---|---|---|---|
| 7,135,665 | B2 * | 11/2006 | Matsuda et al. | 250/208.1 |
| 7,141,775 | B2 * | 11/2006 | Koseki | 250/208.1 |
| 7,652,702 | B2 * | 1/2010 | Murakami et al. | 348/294 |
| 2008/0054320 | A1 * | 3/2008 | Solhusvik et al. | 257/292 |
| 2010/0103302 | A1 * | 4/2010 | Kondo | 348/308 |

FOREIGN PATENT DOCUMENTS

JP 2004-320346 A 11/2004

* cited by examiner

*Primary Examiner*—Lin Ye
*Assistant Examiner*—Marly Camargo
(74) *Attorney, Agent, or Firm*—Westerman, Hattori, Daniels & Adrian, LLP

(57) ABSTRACT

A solid-state imaging apparatus includes: a pixel section where a plurality of pixels for effecting photoelectric conversion are two-dimensionally arranged, having an effective pixel section consisting of pixels for receiving object light and a reference pixel section consisting of pixels shielded from light; a first scanning circuit for sequentially setting to the pixel section the pixels to be read out a signal; a noise suppressing circuit for suppressing noise components of signals from the pixels based on a first control signal associated with sampling and holding of signals from the pixels and a second control signal associated with setting of clamping potential that are applied at respective predetermined timings; a second scanning circuit for sequentially reading signals of each pixel suppressed of the noise components; and a reference signal control section for applying the first and second control signals to the noise suppressing circuit so that it is brought into one or the other of a first condition where signals of the pixels shielded from light are inputted and a second condition where inputting of signals of the pixels shielded from light is lacked without changing an order according to which a release of sampling by the first control signal and a release of setting of clamping potential by the second control signal are effected, causing a generation of a first reference signal obtained in the first condition or a second reference signal obtained in the second condition as a signal corresponding to an optical black level.

6 Claims, 7 Drawing Sheets

SOLID-STATE IMAGING APPARATUS

This application claims benefit of Japanese Patent Application No. 2006-307693 filed in Japan on Nov. 14, 2006, the contents of which are incorporated by this reference.

BACKGROUND OF THE INVENTION

The present invention relates to solid-state imaging apparatus, and more particularly relates to a solid-state imaging apparatus which is capable of suppressing level difference between a black reference level value by a reference potential readout and a black level value of an effective pixel section.

It has conventionally been necessary to correct output variance among pixels when image is to be taken with using a solid-state imaging apparatus. For this reason, a correlation double sampling (hereinafter referred to as CDS) is effected. Further, it is necessary to subtract an error signal (dark current component) due to dark current from an image signal to bring a black level of image signal to a certain level, and a pixel shielded from light (optical black; hereinafter, abbreviated as OB) is referred to so as to detect such dark current component.

In the case where a scene of extremely high luminance throughout or scene containing a high-luminance point light source such as a spot light is to be taken, however, OB signal level may vary and, if a black level correction is effected with using the varied OB signal, a failure in image signal occurs as a consequence.

Figure 1:
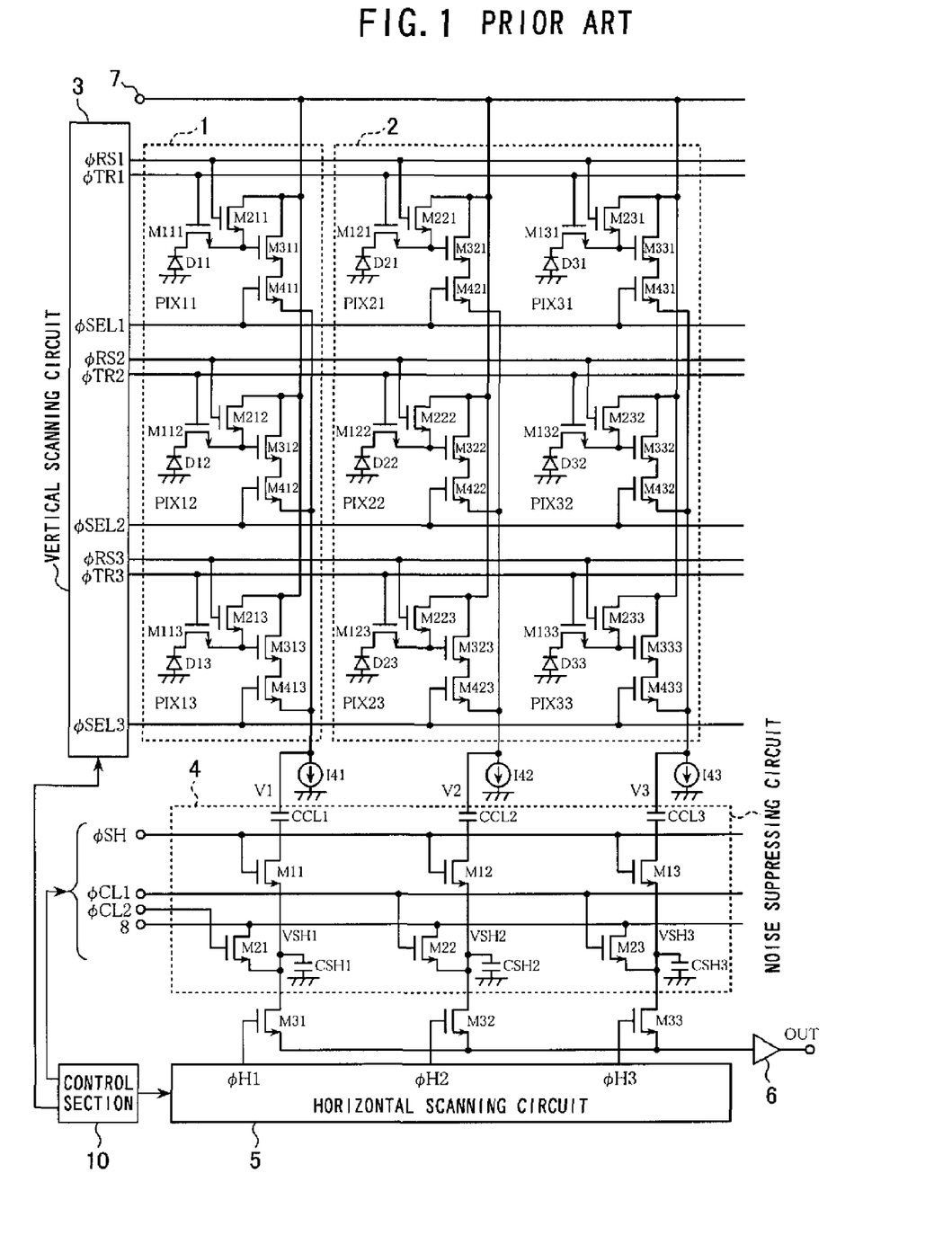
FIG. 1 is a circuit diagram showing construction of a prior-art solid-state imaging apparatus.
Figure 2:
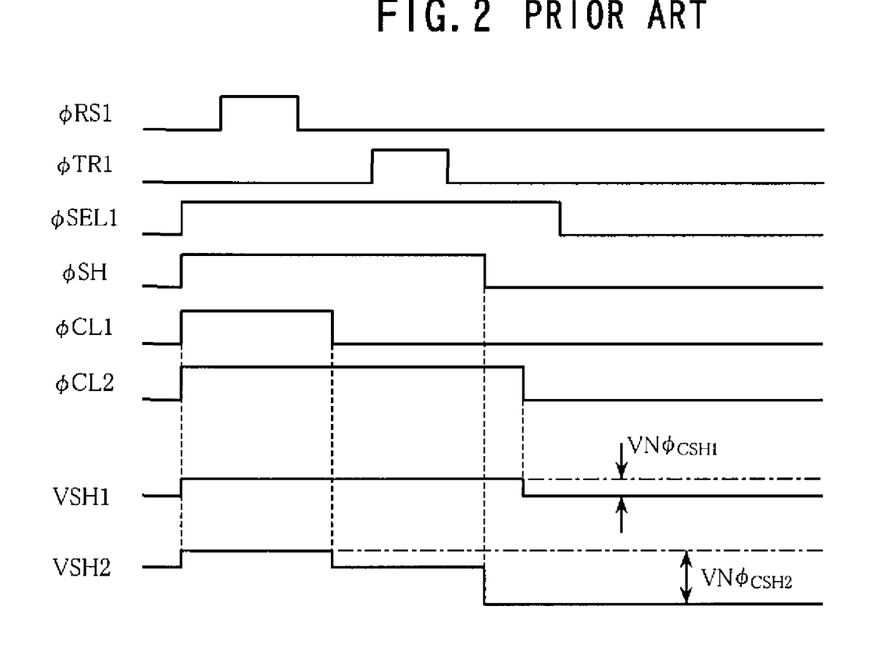
FIG. 2 is a timing chart for explaining operation of the prior-art solid-state imaging apparatus shown in FIG. 1.

A proposal has been made in Japanese Patent Application Laid-Open 2004-320346 to solve this problem. FIG. 1 is a diagram showing construction of the solid-state imaging apparatus disclosed in Japanese Patent Application Laid-Open 2004-320346; and FIG. 2 is a timing chart for explaining its operation. The construction of the solid-state imaging apparatus disclosed in the publication will now be described by way of FIG. 1. Referring to FIG. 1, PIX11 to PIX33 denote pixels arranged into rows and columns (matrix arrangement). Of these pixels PIX11 to PIX33, the pixels PIX11 to PIX13 of the first column constitute a light-shielded pixel section 1 (reference pixel section), and the pixels PIX21 to PIX23, PIX31 to PIX33 of the second and third columns constitute an effective pixel section 2. The surface of each pixel of the light-shielded pixel section 1 is covered with such light-shielding film as aluminum.

The pixels PIX11 to PIX33 of the light-shielded pixel section 1 and effective pixel section 2 each include: a photo-diode D11 to D33; a transfer MOS transistor M111 to M133 for transferring electric charge of the photodiode D11 to D33; a reset MOS transistor M211 to M233 for resetting the transferred electric charge; an amplification MOS transistor M311 to M333 for amplifying electric charge of the photodiode D11 to D33; and a select MOS transistor M411 to M433 for selecting pixels arranged in a row direction.

Further, gate of the reset MOS transistor M211 of the pixel PIX11 is connected to a reset control line φRS1 disposed in a manner extended in a row direction. The gates of reset MOS transistors (M221, M231) of the other pixel cells (PIX21, PIX31) disposed in the same row are also connected in common to the same reset control line φRS1. The gate of the transfer MOS transistor M111 of PIX11 is connected to a PD signal transfer control line φTR1 disposed in a manner extended in the row direction. The gates of the transfer MOS transistors (M121, M131) of the other pixel cells (PIX21, PIX31) disposed in the same row are also connected to the same PD signal transfer control line φTR1. The gate of the select MOS transistor M411 of PIX11 is connected to a row select control line φSEL1 disposed in a manner extended in the row direction. The gates of the select MOS transistors (M421, M431) of the other pixel cells (PIX21, PIX31) disposed in the same row are also connected to the same row select control line φSEL1. Also to the pixels of the second row consisting of the pixels PIX12 to PIX32, a reset line φRS2, PD signal transfer control line φTR2, and row select control line φSEL2 are connected, and a reset control line φRS3, PD signal transfer control line φTR3, and row select control line φSEL3 are connected to the pixels of the third row consisting of the pixel PIX13 to pixel PIX33. These reset control lines φRS1 to φRS3, PD signal transfer control lines φTR1 to φTR3, and row select control lines φSEL1 to φSEL3 are respectively connected to a vertical scanning circuit 3, and signal voltages are supplied from the vertical scanning circuit 3 so that each section of each pixel is driven/controlled.

Further, reference symbols V1 to V3 respectively indicate vertical signal lines for extracting output signal of the amplification MOS transistors M311 to M313, M321 to M323, and M331 to M333 of the pixels arranged in each column. Reference symbols I41 to I43 respectively indicate current sources for biasing the vertical signal lines V1 to V3. A noise suppressing circuit 4 includes clamping capacitors CCL1 to CCL3 that are connected to the respective vertical signal lines V1 to V3, sample-and-hold switches M11 to M13, clamp switches M21 to M23, and sample-and-hold capacitors CSH1 to CSH3. The noise suppressing circuit 4 is to accumulate amplitude components of the vertical signal lines V1 to V3. Further, M31 to M33 each are a horizontal select switch for selecting/outputting output signal of the noise suppressing circuit 4; 5 is a horizontal scanning circuit for driving the horizontal select switches M31 to M33; and 6 is an output amplifier. It should be noted that a predetermined control of the vertical scanning circuit 3, horizontal scanning circuit 5 and noise suppressing circuit 4 is effected by control signal from a control section 10.

A signal read operation of the effective pixel PIX21 in the solid-state imaging apparatus shown in FIG. 1 will now be described by way of a timing chart shown in FIG. 2. At first, before reading electric charge of light signal of the photodiode D21, the reset control line φRS1 and row select line φSEL1 are driven to high level. The gate of the amplification MOS transistor M321 is thereby reset to a pixel power supply 7. Further, the sample-and-hold control line φSH and clamp control line φCL1 are driven to high level. The sampling capacitor CHS2 and clamp capacitor CCL2 are thereby initialized to the potential of a clamp voltage line 8.

Next, the reset control line φRS1 is set to low level. The pixel power supply line 7 can be thereby disconnected from the gate of the amplification MOS transistor M321. Subsequently, the clamp control line φCL1 is brought to low level so as to accumulate reset signal component of the effective pixel PIX21 to the clamp capacitor CCL2. At this time, a connecting point (sample-and-hold line) VSH2 between the sample capacitor CSH2 and the clamp switch M22 is brought into a high-impedance state.

Subsequently, PD signal transfer control line φTR1 is driven to high level so as to transfer a light signal electric charge of the photodiode D21 to the gate of the amplification MOS transistor M321. The PD signal transfer control line φTR1 is then brought to low level to disconnect the photo-diode D21 and the gate of the amplification OS transistor M321 from each other.

At this timing, a potential change or a difference voltage between the reset signal component and the light signal component occurring on the vertical line V2 is accumulated at the sample-and-hold capacitor CSH2 through the clamp capacitor CCL2 and sample-and-hold switch M12. Subsequently, the sample-and-hold control line φSH is brought to low level so that signal component of the effective pixel PIX21 is retained at the sample-and-hold capacitor CSH2.

A reference signal read operation associated with the light-shielded pixel PIX11 will now be described. The operation up to the initialization of the clamp capacitor CCL1 and the sampling capacitor CSH1 to the potential of the clamp voltage line 8 by operating the clamp control line φCL2 and the clamp control line φCL1 at the same timing is identical to that of the effective pixel PIX21 and will not be described. Now, after the initialization of the clamp capacitor CCL1 and sampling capacitor CSH1 to the potential of the clamp voltage line 8, the reset control line φRS1 is set to low level. The pixel power supply line 7 can be thereby disconnected from the gate of the amplification MOS transistor M311. At this time, the clamp control line φCL2 retains high level, and terminal potentials of the clamp capacitor CCL1 and the sample-and-hold capacitor CSH1 remain to be fixed to the potential of the clamp voltage line 8.

Subsequently, PD signal transfer control line φTR1 is driven to high level to transfer a light signal electric charge of the photodiode D11 to the gate of the amplification MOS transistor M311. The PD signal transfer control line φTR1 is then brought to low level to disconnect the photodiode D11 from the gate of the amplification MOS transistor M311.

Subsequently, while the sample-and-hold control line φSH is brought to low level, clamp control line φCL2 is kept to high level. The terminal potentials of the clamp capacitor CCL1 and sample-and-hold capacitor CSH1 thereby remain to be fixed to the potential of the clamp voltage line 8. Finally, the clamp control line φCL2 is brought to low level so that a signal VSH1 sampled at the sampling capacitor CSH1 is brought to the potential of the clamp voltage line 8.

It should be noted that, in FIG. 2, $VN\phi_{CSH1}$ is a noise resulting from feedthrough components occurring on the sample-and-hold line VSH1 when reference signal associated with the light-shielded pixel PIX11 is read out, which is consisting of the noise resulting from the feedthrough component due to gate-source overlap capacitance of the clamp switch M21. Further, $VN\phi_{CSH2}$ is a noise resulting from feedthrough components occurring on the sample-and-hold line VSH2 when black level signal of the effective pixel PIX21 is read out, which is consisting of an addition of the noise resulting from the feedthrough component due to gate-source overlap capacitance of the clamp switch 22 and the noise resulting from the feedthrough component due to gate-source overlap capacitance of the sample-and-hold switch M12.

SUMMARY OF THE INVENTION

In a first aspect of the invention, there is provided a solid-state imaging apparatus including: a pixel section where a plurality of pixels for effecting photoelectric conversion are two-dimensionally arranged, having an effective pixel section consisting of pixels for receiving object light and a reference pixel section consisting of pixels shielded from light; a first scanning circuit for sequentially setting to the pixel section the pixels to be read out a signal; a noise suppressing circuit for suppressing noise components of signals from the pixels based on a first control signal associated with sampling and holding of signals from the pixels and a second control signal associated with setting of clamping potential that are applied at respective predetermined timings; a second scanning circuit for sequentially reading signals of each pixel suppressed of the noise components; and a reference signal control section for applying the first and the second control signals to the noise suppressing circuit so that it is brought into one or the other of a first condition where signals of the pixels shielded from light are inputted and a second condition where inputting of signals of the pixels shielded from light is lacked without changing an order according to which a release of sampling by the first control signal and a release of setting of clamping potential by the second control signal are effected, causing a generation of a first reference signal obtained in the first condition or a second reference signal obtained in the second condition as a signal corresponding to an optical black level.

In a second aspect of the invention, the reference signal control section in the solid-state imaging apparatus according to the first aspect, in the second condition, sets the order according to which the release of sampling by the first control signal and the release of setting of clamping potential by the second control signal are effected as the same in relation to a timing at which signals of the pixels shielded from light are inputted.

In a third aspect of the invention, the noise suppressing circuit in the solid-state imaging apparatus according to the second aspect at least includes a clamping capacitor connected to each signal line connected to the pixels by a unit of a column of the pixel section, a clamp switch for setting a clamping potential to the clamping capacitor, a sample-and-hold capacitor, and a sample-and-hold switch for causing signals of the pixels after the noise suppression obtained by the clamping capacitor to be retained at the sample-and-hold capacitor, wherein the sample-and-hold switch is controlled by the first control signal and the clamp switch by the second control signal.

In a fourth aspect of the invention, the noise suppressing section in the solid-state imaging apparatus according to the second aspect includes a clamping capacitor for obtaining a signal output corresponding to a level difference from a signal level of the pixels at a second timing with setting as a reference a signal level of the pixels at a first timing at which the second control signal is applied, and an amplification section for outputting an inverting amplification signal or a non-inverting amplification signal of the signal output obtained at the clamping capacitor.

In a fifth aspect of the invention, the noise suppressing section in the solid-state imaging apparatus according to the second aspect includes a clamping capacitor for obtaining a signal output corresponding to a level difference from a signal level of the pixels at a second timing with setting as a reference a signal level of the pixels at a first timing at which the second control signal is applied, an inverting amplification section for outputting an inverting amplification signal of the signal output obtained at the clamping capacitor, a feedback capacitor electrically connected between an input and an output of the inverting amplification section, and a short-circuit switch for short-circuiting between the input and the output of the inverting amplification section, wherein the short-circuit switch is controlled by the second control signal.

In a sixth aspect of the invention, the noise suppressing section in the solid-state imaging apparatus according to the second aspect includes a clamping capacitor for obtaining a signal output corresponding to a level difference from a signal level of the pixels at a second timing with setting as a reference a signaL level of the pixels at a first timing at which the second control signal is applied, a differential amplification section for amplifying and outputting in a non-inverting manner the signal output from the clamping capacitor applied to a non-inverting input terminal thereof, a feedback capacitor electrically connected between an inverting input terminal and an output terminal of the differential amplification section, an amplification capacitor connected between the inverting input terminal and a reference potential, a short-circuit switch for short-circuiting between the inverting input terminal and the output terminal, and a clamp switch for setting the non-inverting input terminal to a clamping potential, wherein the clamp switch is controlled by the second control signal, and the short-circuit switch is controlled by a control signal having a timing opened between the release of sampling by the first control signal and the release of setting of clamping potential by the second control signal.

DESCRIPTION OF THE PREFERRED EMBODIMENTS

Some embodiments of the solid-state imaging apparatus according to the invention will be described below with reference to the drawings.

Embodiment 1

A first embodiment of the solid-state imaging apparatus according to the invention will now be described. The construction itself of the solid-state imaging apparatus according to the first embodiment is identical to the construction of the solid-state imaging apparatus of the prior-art example shown in FIG. 1, and its diagrammatic illustration will be omitted. Concerning drive method of the solid-state imaging apparatus according to the first embodiment, a reference potential read operation associated with the light-shielded pixel PIX11 will now be described by way of a timing chart shown in FIG. 3. The operation up to the initialization of the clamping capacitor CCL1 and sampling capacitor CSH1 in the noise suppressing circuit 4 to a potential of the clamp voltage line 8 is identical to the prior-art example, and its description will not be repeated. Now, in the first embodiment, after the initialization of the clamping capacitor CCL1 and sampling capacitor CSH1 to the potential of the clamp voltage line 8, reset control line φRS1 is set to low level. The pixel power supply line 7 and the gate of the amplification MOS transistor M311 can be thereby disconnected from each other. At this time, the clamp control line φCL2 retains high level, and terminal potentials of the clamping capacitor CCL1 and sample-and-hold capacitor CSH1 remain to be fixed to the potential of the clamp voltage line 8.

Figure 3:
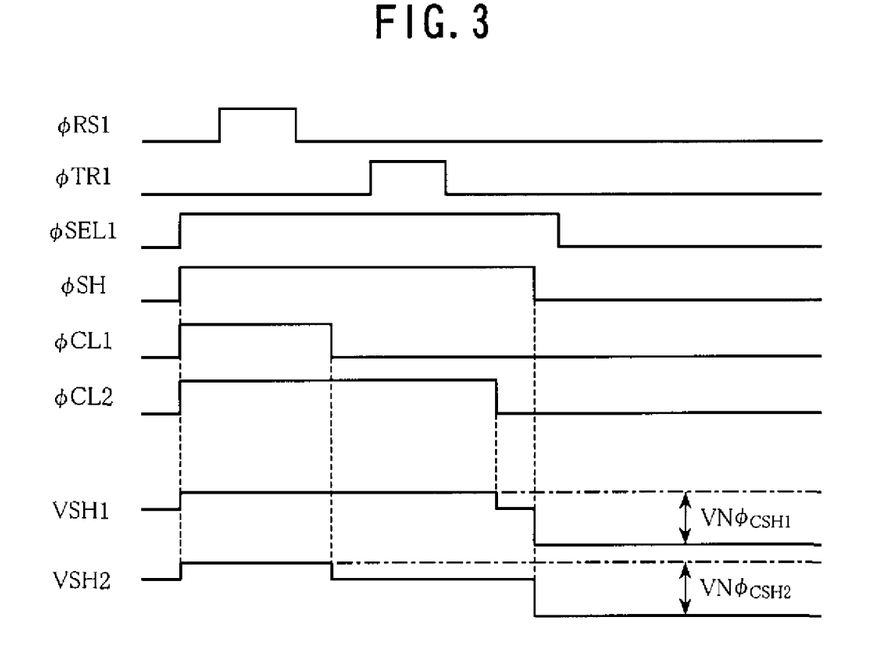
FIG. 3 is a timing chart for explaining a reference potential read operation in a first embodiment of the solid-state imaging apparatus according to the invention.

Subsequently, PD signal transfer control line φTR1 is driven to high level so as to transfer a light signal electric charge of the photodiode D11 to the gate of the amplification MOS transistor M311. By then bringing the PD signal transfer control line φTR1 to low level, the photodiode D11 and the gate of the amplification MOS transistor M311 are disconnected from each other.

By subsequently bringing clamp control line φCL2 to low level, the clamp voltage line 8 is disconnected from the sampling capacitor CSH1. At this time, the potential of the clamp voltage line 8 is accumulated at the sample-and-hold capacitor CSH1 so that a connecting point (sample-and-hold line) VSH1 between the sampling capacitor CSH1 and the clamp switch is brought to a high-impedance state. Finally, the sample-and-hold control line φSH is brought to low level. While an amount corresponding to change after its becoming high-impedance state is to be conserved at the sample-and-hold capacitor CSH1, the potential of the clamp voltage line 8 is retained at the sample-and-hold capacitor CSH1 due to the fact that there is no change in potential of the output signal of the vertical signal line V1. The read operation of the effective pixel PIX21 is identical to the prior-art example and will not be described.

As has been described, in the first embodiment, the drive in both reading of effective pixels and reading of reference potentials is effected so that the sample-and-hold control line φSH becomes low level after the clamp control lines φCL1 and φCL2 are brought to low level. An equality is thereby achieved between noise $VN\phi_{CL1}$ occurring at the sample-and-hold capacitor CSH1 due a gate-source overlap capacitance of the sample-and-hold switch M11 and gate-source overlap capacitance of the clamp switch M21, and noise $VN\phi_{CL2}$ occurring at the sample-and-hold capacitor CSH2 due to gate-source overlap capacitance of the sample-and-hold switch M12 and gate-source overlap capacitance of the clamp switch M22.

Here, supposing gate-source overlap capacitance of the sample-and-hold switch M11 to M13 and gate-source overlap capacitance of the clamp switch M21 to M23 as the same value $C_P$, clamp capacitance CCL1 to CCL3 as the same value CCL (CCL1=CCL2=CCL3=CCL), sample-and-hold capacitance CSH1 to CSH3 as the same value CSH (CSH1=CSH2=CSH3=CSH), and supposing the same value $V\phi_{CDS}$ for a voltage change $V\phi_{SH}$ of the sample-and-hold control line φSH after the turning OFF of the sample-and-hold switch M11 to M13, voltage change $V\phi_{CL1}$ of the clamp control line φCL1 after the turning OFF of the clamp switch M22, and voltage change $V\phi_{CL2}$ of the clamp control line φVCL2 after the turning OFF of the clamp switch M21 ($V\phi_{SH}=V\phi_{CL1}=V\phi_{CL2}=V\phi_{CDS}$), noise $VN\phi_{CSH1}$ due to feedthrough component occurring on the sample-and-hold line VSH1 and noise $VN\phi_{CSH2}$ due to feedthrough component occurring on the sample-and-hold line VSH2 are obtained as in the following expression.

$$VN\phi_{CSH1} = VN\phi_{CSH2}$$
$$= V\phi_{CDS}[C_P/(3C_P + CSH + CCL)] + V\phi_{CDS}[C_P/(2C_P + CSH)]$$

Accordingly, at the noise suppressing circuit 4 as the above, the level difference between the black reference level value by a reference potential read and the black level value of effective pixel section can be eliminated by driving the sample-and-hold control line φSH to low level after the clamp control line φCL2 is brought to low level.

Embodiment 2

Figure 4:
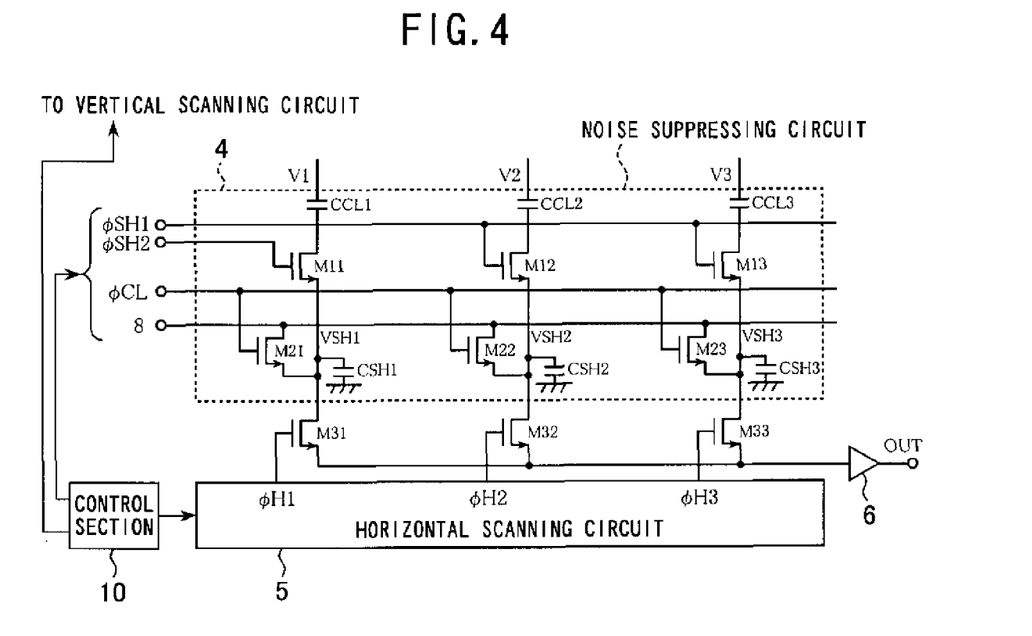
FIG. 4 is a circuit diagram showing construction of a main portion of the solid-state imaging apparatus according to a second embodiment of the invention.

A second embodiment of the invention will now be described. FIG. 4 is a circuit diagram showing construction of a main portion of the solid-state imaging apparatus according to the second embodiment. The construction of the rest is identical to the prior-art example shown in FIG. 1. In the second embodiment shown in FIG. 4, like components as in the solid-state imaging apparatus of the construction corresponding to the prior-art example and the first embodiment shown in FIG. 1 are denoted by like reference numerals, and a description will be given below mainly of the portion different in construction with omitting a duplicate description. In this embodiment as shown in FIG. 4, the sample-and-hold switch M11 of the first column of the noise suppressing circuit 4 is driven and controlled by the sample-and-hold control line φSH2, and the sample-and-hold switches M12, M13 of the second and third columns are driven and controlled by the sample-and-hold control line φSH1. Further, gates of the clamp switches M21 to M23 are connected to the same one clamp control line φCL. In other words, all of the clamp switches M21 to M23 are driven and controlled in common by the clamp control line φCL. The construction of the rest is similar to the prior-art example (or the first embodiment) shown in FIG. 1.

Figure 5:
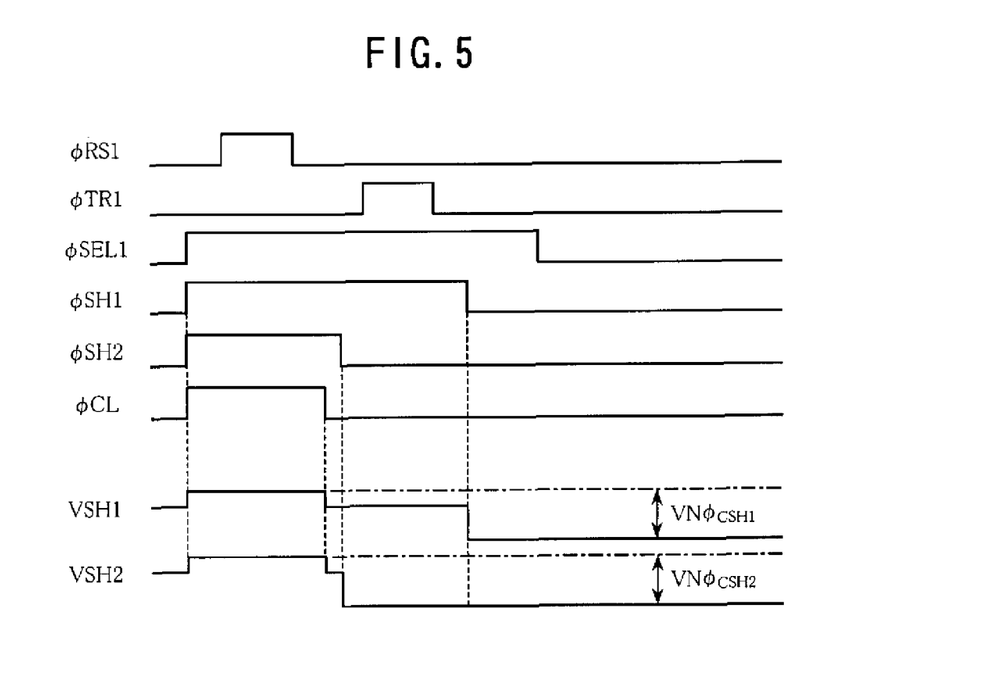
FIG. 5 is a timing chart for explaining operation of the second embodiment shown in FIG. 4.

An operation of the second embodiment constructed in this manner will now be described by way of a timing chart shown in FIG. 5. Referring to the timing chart shown in FIG. 5, drive is effected respectively of the sample-and-hold control line φSH1 with setting the same timing as the sample-and-hold control line φSH in FIG. 2, and of the clamp control line φCL with setting the same timing as the clamp control line φCL1 in FIG. 2. The read operation of the effective pixel PIX21 thereby becomes of the same drive timing as the operation shown in the timing chart of FIG. 2, and such operation thus will not be described.

A description will now be given in detail of read operation of reference signal associated with the light-shielded pixel PIX11 with reference to a timing chart shown in FIG. 5. In this reference signal read operation, the operation up to the accumulation of potential of the clamp voltage line 8 to the clamping capacitor CCL1 is identical to the first embodiment shown in FIG. 3, and a duplicate description of such operation will be omitted. Now, in the second embodiment, after completion of an accumulation to the clamping capacitor CCL1, the clamp control line φCL is brought to low level so as to bring a connecting point (sample-and-hold line) VSH1 between the sample-and-hold capacitor CSH1 and the clamp switch M21 to a high-impedance state. Subsequently to this, the sample-and-hold control line φSH2 is returned to low level so as to retain the clamp voltage level or in other words the potential of the clamp voltage line 8 at the sample-and-hold capacitor CSH1.

Subsequently, PD signal transfer control line φTR1 is driven to high level so as to transfer a light signal electric charge of the photodiode D11 to the gate of the amplification MOS transistor M311 through the transfer MOS transistor M111. After completion of this transfer, then, the PD signal transfer control line φTR1 is returned to low level so as to disconnect the photodiode D11 from the gate of the amplification MOS transistor M311. The sample-and-hold capacitor CSH1 continues to retain the clamp voltage level which is the potential of the clamp voltage line 8.

As has been described, in the second embodiment, the sample-and-hold control lines φSH1, φSH2 become low level after the clamp control line φCL is brought to low level both at the time of reading effective pixels and at the time of a reference potential read. An equality is thereby achieved between noise VNφ$_{CSH1}$ occurring at the sample-and-hold capacitor CSH1 due to a gate-source overlap capacitance of the sample-and-hold switch M11 and gate-source overlap capacitance of the clamp switch M21 corresponding to an output signal of the light-shielded pixel PIX11, and noise VNφ$_{CSH2}$ occurring at the sample-and-hold capacitor CSH2 due to a gate-source overlap capacitance of the sample-and-hold switch M12 and gate-source overlap capacitance of the clamp switch M22 corresponding to an output signal of the effective pixel PIX21.

Here, supposing gate-source overlap capacitance of the sample-and-hold switch M11 to M13 and gate-source overlap capacitance of the clamp switch M21 to M23 as the same value Cp clamp capacitance CCL1 to CCL3 as the same value CCL (CCL1=CCL2=CCL3=CCL), sample-and-hold capacitance CSH1 to CSH3 as the same value CSH (CSH1=CSH2=CSH3=CSH), and supposing the same value Vφ$_{CDS}$ for a voltage change Vφ$_{SH1}$ of the sample-and-hold control line φSH1 after the turning OFF of the sample-and-hold switch M12, voltage change Vφ$_{SH2}$ of the sample-and-hold control line φSH2 after the turning OFF of the sample-and-hold switch M11, and voltage change Vφ$_{CL}$ of the clamp control line φCL after the turning OFF of the clamp switches M21 to M23 (Vφ$_{SH1}$=Vφ$_{SH2}$=Vφ$_{CL}$=Vφ$_{CDS}$), noise VNφ$_{CSH1}$ due to feedthrough component occurring on the sample-and-hold line VSH1 and noise VNφ$_{CSH2}$ due to feedthrough component occurring on the sample-and-hold line VSH2 are obtained as in the following expression.

$$\begin{aligned}VN\phi_{CSH1} &= VN\phi_{CSH2} \\ &= V\phi_{CDS}[C_P/(3C_P + CSH + CCL)] + \\ &\quad V\phi_{CDS}[C_P/(2C_P + CSH)]\end{aligned}$$

Accordingly, at the noise suppressing circuit 4, the level difference between the black reference level value by a reference potential readout of light-shielded pixel and the black level value of effective pixel can be eliminated by driving the sample-and-hold control line φSH2 for driving the sample-and-hold switch M11 corresponding to an output signal of light-shielded pixel to low level after the clamp control line φCL becomes low level.

Embodiment 3

Figure 6:
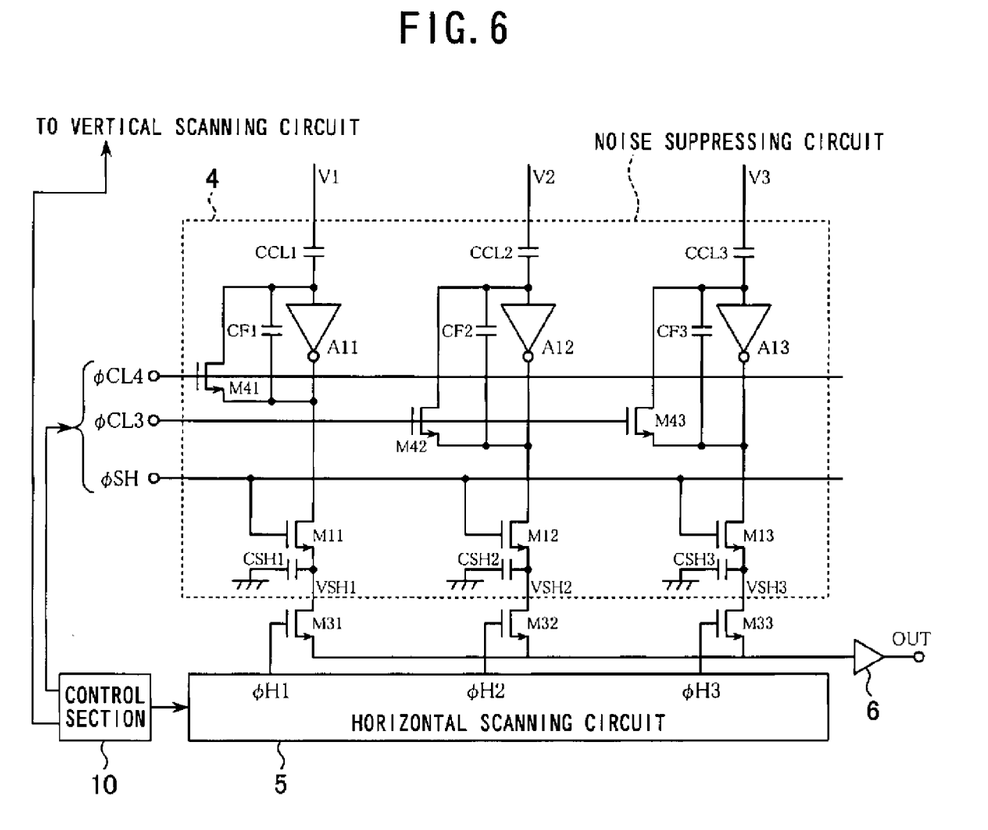
FIG. 6 is a circuit diagram showing construction a main portion of the solid-state imaging apparatus according to a third embodiment of the invention.

A third embodiment of the invention will now be described. FIG. 6 is a circuit diagram showing construction of a main portion of the solid-state imaging apparatus according to the third embodiment. The construction of the rest is identical to the prior-art example (or first embodiment) shown in FIG. 1. Also in FIG. 6, like components as in the solid-state imaging apparatus of the construction corresponding to the prior-art example and the first embodiment shown in FIG. 1 are denoted by Like reference numerals, and a description will be given below mainly of the portion different in construction with omitting a duplicate description. As shown in FIG. 6, this embodiment employs a different construction for the noise suppressing circuit 4. The noise suppressing circuit 4 in this embodiment includes: clamping capacitors CCL1 to CCL3 respectively connected to vertical signal lines V1 to V3; inverting amplifiers A11 to A13; short-circuit switches M41 to M43 for short-circuiting between an input and output of the inverting amplifiers; sample-and-hold switches M11 to M13; sample-and-hold capacitors CSH1 to CSH3; and feedback capacitors CF1 to CF3 connected between the input and output of the inverting amplifiers. The gate of the short-circuit switch M41 is connected to a clamp control line φCL4, and the gates of the short-circuit switches M42 and M43 are connected to a clamp control line φCL3, the gates of the sample-and-hold switches M11 to M13 being connected in common to a sample-and-hold control line φSH.

Figure 7:
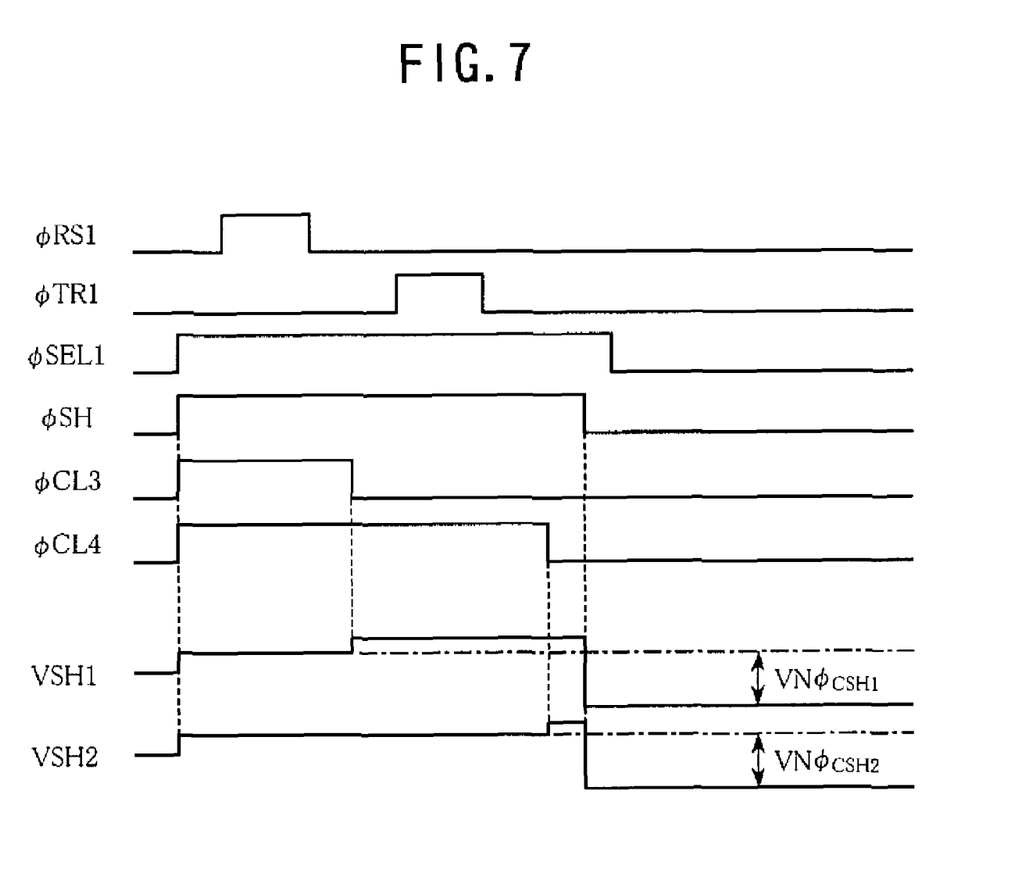
FIG. 7 is a timing chart for explaining operation of the third embodiment shown in FIG. 6.

A read operation of the effective pixel PIX21 in the solid-state imaging apparatus according to the third embodiment will now be described with reference to a timing chart shown in FIG. 7. Before reading a light signal electric charge of photodiode D21, the reset control line φRS1 and row select line φSEL1 are driven to high level. The gate of the amplification MOS transistor M321 is thereby reset to a voltage level of the pixel power supply 7. Further, the sample-and-hold control line φSH and clamp control line φCL3 of the noise suppressing circuit 4 are driven to high level to thereby initialize the sampling capacitor CHS2 and clamping capacitor CCL2 to a reset voltage which is an output voltage when the input terminal and output terminal of the inverting amplifier A12 is short-circuited.

Next, the reset control line φRS1 is set to low level. It is thereby possible to disconnect the pixel power supply line 7 from the gate of the amplification MOS transistor M321. Subsequently, a reset signal component is accumulated at the clamping capacitor CCL2 by bringing the clamp control line φCL3 to low level. Subsequently, PD signal transfer control line φTR1 is driven to high level to transfer a light signal electric charge of photodiode D21 to the gate of the amplification MOS transistor M321. By then bringing the PD signal transfer control line φTR1 to low level, the photodiode D21 is disconnected from the gate of the amplification MOS transistor M321.

At this timing, a change in potential, which is the voltage difference between a reset signal component and a light signal component occurring on the vertical line V2, is amplified by multiplication of (−CCL2/CF2) through the clamping capacitor CCL2 and inverting amplifier A12, and the amplified potential is accumulated to the sample-and-hold capacitor CSH2. By subsequently bringing the sample-and-hold control line φSH to low level, an amplified signal of multiplication of the signal component of the effective pixel PIX21 by (−CCL2/CF2) is retained at the sample-and-hold capacitor CSH2.

A description will now be given by way of a timing chart shown in FIG. 7 with respect to a reference potential read operation associated with the light-shielded pixel PIX11 in the solid-state imaging apparatus according to the third embodiment. The operation up to the initialization of the sampling capacitor CHS1 and clamping capacitor CCL1 in the noise suppressing circuit 4 to a reset potential is identical to the read operation of the effective pixel PIX21 and will not be described. Now, in the reference potential read operation, after initializing the sampling capacitor CSH1, clamping capacitor CCL1 to a reset potential, the reset control line φRS1 is set to low level. The pixel power supply line 7 and the gate of the amplification MOS transistor M311 can be thereby disconnected from each other. At this time, the clamp control line φCL4 retains high level, and terminal potentials of the clamping capacitor CCL1 and sample-and-hold capacitor CSH1 remain to be fixed to the reset potential. Further, even in the period during which PD signal transfer control line φTR1 becomes high level, the clamp control line φCL4 retains high level.

Subsequently, the clamp control line φCL4 is brought to low level. Finally, the sample-and-hold control line φSH is brought to low level. While an amount corresponding to change after its becoming high-impedance state is to be conserved at the sample-and-hold capacitor CSH1, the reset potential is retained at the sample-and-hold capacitor CSH1 due to the fact that there is no change in potential of the output signal of the vertical signal line V1.

As has been described, in the third embodiment, the sample-and-hold control line φSH becomes low level after attaining of low level respectively of the clamp control lines φCL3 and φCL4 both at the time of reading effective pixels and at the time of reading reference potential associated with light-shielded pixels. An equality is thereby achieved between noise $VN\phi_{CSH1}$ occurring at the sample-and-hold capacitor CSH1 due to a gate-source overlap capacitance of the sample-and-hold switch M11 and gate-drain overlap capacitance of the short-circuit switch M41, and noise $VN\phi_{CSH2}$ occurring at the sample-and-hold capacitor CSH2 due to a gate-source overlap capacitance of the sample-and-hold switch M12 and gate-drain overlap capacitance of the short-circuit switch M42.

Here, supposing gate-source overlap capacitance of the sample-and-hold switch M11 to M13 and gate-drain overlap capacitance of the short-circuit switch M41 to M43 as the same value $C_P$, clamp capacitance CCL1 to CCL3 as the same value CCL (CCL1=CCL2=CCL3=CCL), feedback capacitance CF1 to CF3 as the same capacitance CF (CF1=CF2=CF3=CF), sample-and-hold capacitance CSH1 to CSH3 as the same value CSH (CSH1=CSH2=CSH3=CSH), and supposing the same value for a voltage change $V\phi_{SH}$ of the sample-and-hold control line φSH after the turning OFF of the sample-and-hold switch M11 to M13, voltage change $V\phi_{CL4}$ of the clamp control line φCL4 after the turning OFF of the short-circuit switch M41, and voltage change $V\phi_{CL3}$ of the clamp control line φCL3 after the turning OFF of the short-circuit switch M42 ($V\phi_{SH}=V\phi_{CL4}=V\phi_{CL3}=V\phi_{CDS}$), noise $VN\phi_{CSH1}$ due to feedthrough component occurring on the sample-and-hold line VSH1 and noise $VN\phi_{CSH2}$ due to feedthrough component occurring on the sample-and-hold line VSH2 are obtained as in the following expression.

$$VN\phi_{CSH1} = VN\phi_{CSH2}$$
$$= -V\phi_{CDS}(C_P/CF) + V\phi_{CDS}[C_P/(C_P + CSH)]$$

Accordingly, the level difference between the black reference level value by a reference potential read associated with light-shielded pixels and the black level value of effective pixel section can be eliminated at the noise suppressing circuit 4 by driving the sample-and-hold control line φSH to low level after the attaining of low level of the clamp control line φCL4. Further, signal is amplified at the noise suppressing circuit 4 so that an effect of noise occurring at the later part of the noise suppressing circuit 4 can be suppressed so as to improve S/N. In addition, since amplification factor of the inverting amplification section can be set by clamping capacitor and feedback capacitor, a current consumption at the noise suppressing circuit 4 can be made smaller.

Embodiment 4

Figure 8:
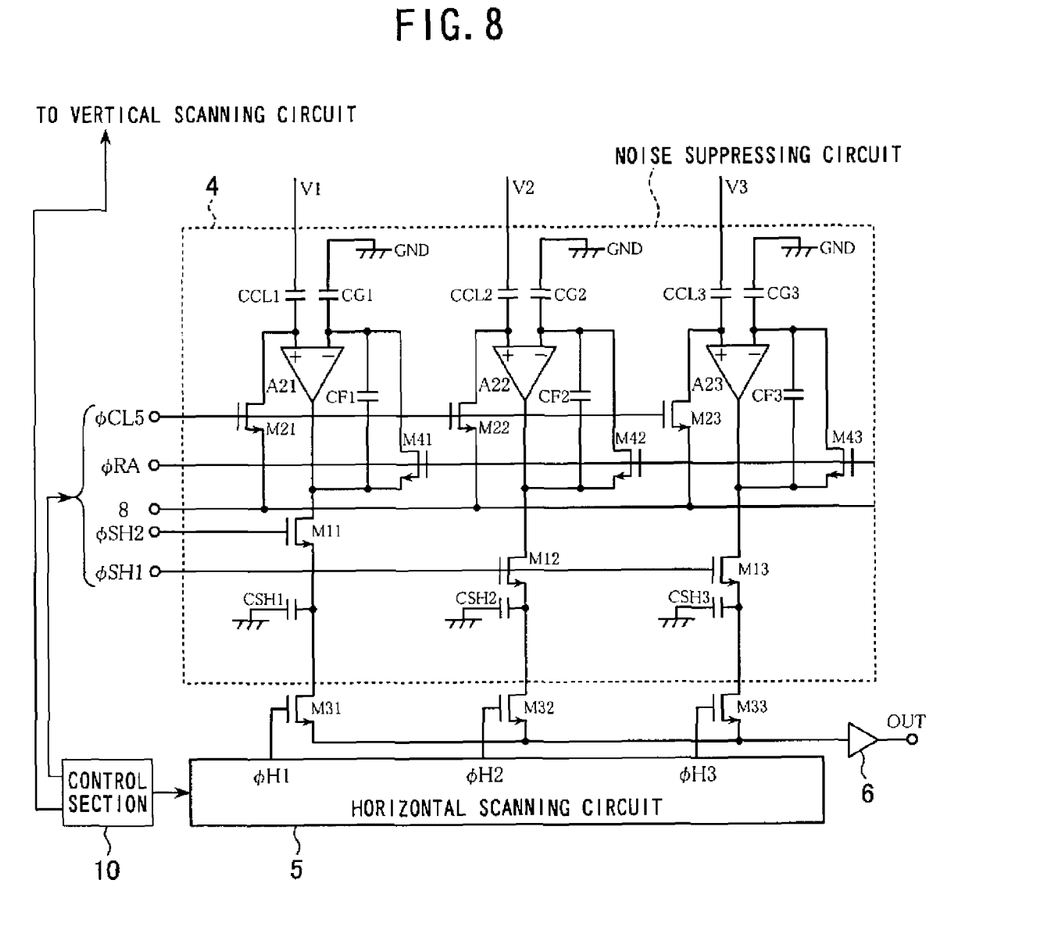
FIG. 8 is a circuit diagram showing construction of a main portion of the solid-state imaging apparatus according to a fourth embodiment of the invention.

A fourth embodiment of the invention will now be described. FIG. 8 is a circuit diagram showing construction of a main portion of the solid-state imaging apparatus according to the fourth embodiment. The construction of the rest is identical to the prior-art example (or first embodiment) shown in FIG. 1. Also in FIG. 8, like components as in the solid-state imaging apparatus of the construction corresponding to the prior-art example (or the first embodiment) shown in FIG. 1 are denoted by like reference numerals, and a description will be given below mainly of the portion different in construction with omitting a duplicate description. As shown in FIG. 8, this embodiment employs a different construction for the noise suppressing circuit 4. The noise suppressing circuit 4 in this embodiment includes: clamping capacitors CCL1 to CCL3 respectively connected to vertical signal lines V1 to V3; differential input amplifiers A21 to A23; clamp switches M21 to M23 disposed between a non-inverting input of the differential input amplifiers and the clamp potential line 8; sample-and-hold switches M11 to M13; sample-and-hold capacitors CSH1 to CSH3; short-circuit switches M41 to M43 and feedback capacitors CF1 to CF3 connected between an inverting input and the output of the differential input amplifiers; and amplification capacitors CG1 to CG3 connected between the inverting input of the differential input amplifiers and GND. The gates of the clamp switches M21 to M23 are controlled in common by a clamp control line $\phi CL5$, and the gates of the short-circuit switches M41 to M43 are connected in common to a short-circuit control line $\phi RA$, the gate of the sample-and-hold switch M11 being connected to a sample-and-hold control line $\phi SH2$ and the sample-and-hold switches M12, M13 being connected in common to a sample-and-hold control line $\phi SH1$.

Figure 9:
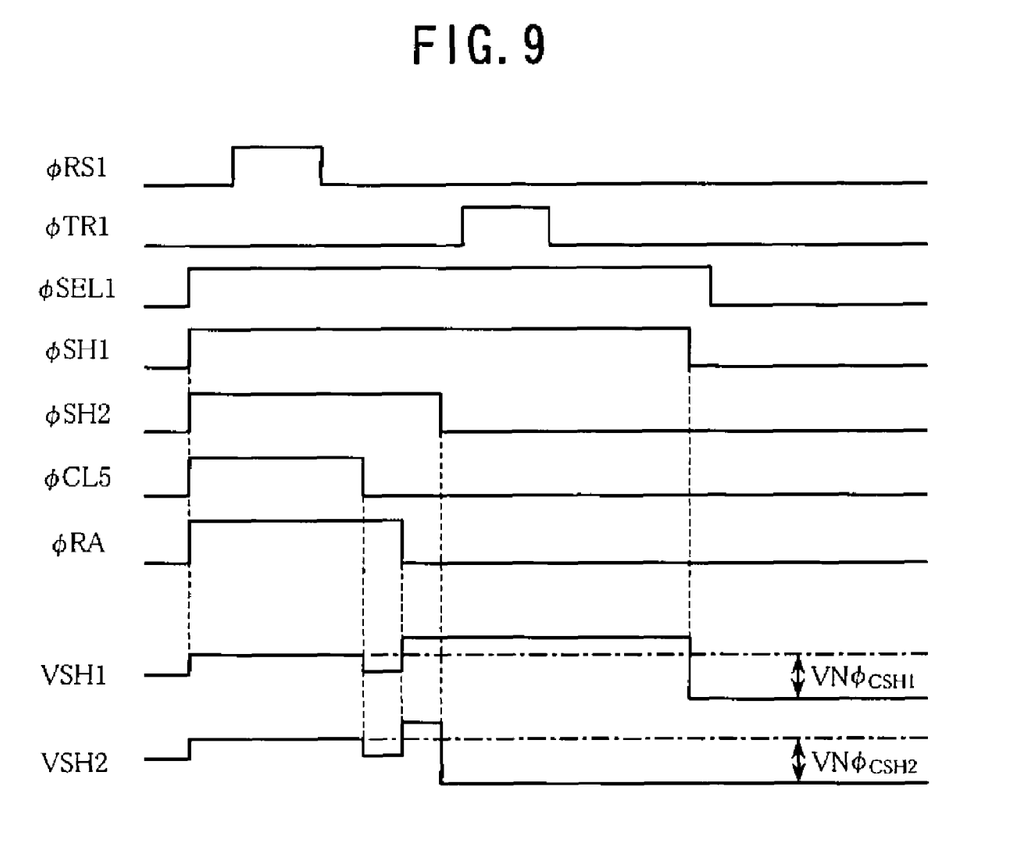
FIG. 9 is a timing chart for explaining operation of the fourth embodiment shown in FIG. 8.

A read operation of the effective pixel PIX21 in the solid-state imaging apparatus according to the fourth embodiment will now be described with reference to a timing chart shown in FIG. 9. Before reading a light signal electric charge of photodiode D21, the reset control line $\phi RS1$ and row select line $\phi SEL1$ are driven to high level. The gate of the amplification MOS transistor M321 is thereby reset to a voltage level of the pixel power supply 7. Further, the sample-and-hold control line $\phi SH1$, clamp control line $\phi CL5$, and short-circuit control line $\phi RA$ are driven to high level to fix the clamp capacitor CCL2 to a clamp voltage level which is the potential of the clamp voltage line 8. At this time, since the differential input amplifier A22 is connected in the condition of a voltage follower connection, the sample-and-hold capacitor CSH2 and amplification capacitor CG2 are fixed to the clamp voltage level which is the potential of the clamp voltage line 8.

Next, the reset control line $\phi RS1$ is set to low level. It is thereby possible to disconnect the pixel power supply line 7 from the gate of the amplification MOS transistor M321. Subsequently, a reset signal component is accumulated at the clamping capacitor CCL2 by bringing the clamp control line $\phi CL5$ to low level. Subsequently to this, the short-circuit control line $\phi RA$ is brought to low level to end the short-circuited condition between the input and output of the differential input amplifier A22.

Subsequently, PD signal transfer control line $\phi TR1$ is driven to high level to transfer a light signal electric charge of photodiode D21 to the gate of the amplification MOS transistor M321. By then bringing the PD signal transfer control line $\phi TR1$ to low level, the photodiode is disconnected from the gate of the amplification MOS transistor M321.

At this timing, a change in potential, which is the voltage difference between a reset signal component and a light signal component occurring on the vertical line V2, is accumulated at the clamping capacitor CCL2. Further, a signal of multiplication of potential change, which is a difference voltage between a reset signal component and light signal component, by $[(CF2+CCL2)/CF2]$ is accumulated at the sample-and-hold capacitor CSH2 through the differential input amplifier A22. By subsequently bringing the sample-and-hold control line $\phi SH1$ to low level, an amplified signal obtained by multiplying the signal component of the effective pixel PIX21 by $[(CF2+CCL2)/CF]$ is retained at the sample-and-hold capacitor CSH2.

A description will now be given by way of a timing chart shown in FIG. 9 with respect to a reference potential read operation associated with light-shielded pixels in the solid-state imaging apparatus according to the fourth embodiment. The operation up to the end of reset condition of the differential input amplifier A21 is identical to the read operation of the effective pixel PIX21, and a description of such operation thus will be omitted. Now, in the reference potential read operation, after ending the short-circuited condition of the differential input amplifier A21, the sample-and-hold control line $\phi SH2$ is set to low Level. The clamp potential is thereby being retained at the sample-and-hold capacitor CSH1.

Subsequently, PD signal transfer control line $\phi TR1$ is driven to high level so as to transfer a light signal electric charge of photodiode D11 to the gate of the amplification MOS transistor M311 through the transfer MOS transistor M111. After the end of this transfer, the PD signal transfer control line $\phi TR1$ is returned to low level so as to disconnect photodiode D11 from the gate of the amplification MOS transistor M311. The sample-and-hold capacitor CSH1 continues to retain the clamp voltage level which is the potential of the clamp voltage line 8.

As has been described, in the fourth embodiment, the sample-and-hold control lines $\phi SH1$ and $\phi SH2$ respectively become low level after attaining of low level of the clamp control line $\phi CL5$ and short-circuit control line $\phi RA$ both at the time of reading effective pixels and at the time of reading reference potential associated with light-shielded pixels. An equality is thereby achieved between noise $VN\phi_{CSH1}$ occurring at the sample-and-hold capacitor CSH1 due to a gate-drain overlap capacitance of the clamp switch M21, gate-source overlap capacitance of the sample-and-hold switch M11 and gate-drain overlap capacitance of the short-circuit switch M41, and noise $VN\phi_{CSH2}$ occurring at the sample-and-hold capacitor CSH2 due to a gate-drain overlap capacitance of the clamp switch M22, gate-source overlap capacitance of the sample-and-hold switch M12 and gate-drain overlap capacitance of the short-circuit switch M42.

Here, supposing gate-drain overlap capacitance of the clamp switch M21 to M23, gate-source overlap capacitance of the sample-and-hold switch M11 to M13 and gate-drain overlap capacitance of the short-circuit switch M41 to M43 as the same value $C_P$, clamp capacitance CCL1 to CCL3 as the same value CCL (CCL1=CCL2=CCL3=CCL), feedback capacitance CF1 to CF3 as the same capacitance CF (CF1=CF2=CF3=CF), amplification capacitance CG1 to CG3 as the same value CG (CG1=CG2=CG3=CG), sample-and-hold capacitance CSH1 to CSH3 as the same value CSH (CSH1=CSH2=CSH3=CSH), and supposing the same value $V\phi_{CDS}$ for a voltage change $V\phi_{CL5}$ of the clamp control line $\phi CL5$ after the turning OFF of the clamp switch M21 to M23, voltage change $V\phi_{SH2}$ of the sample-and-hold control line $\phi SH2$ after the turning OFF of the sample-and-hold switch M11, voltage change $V\phi_{SH1}$ of the sample-and-hold control line $\phi SH1$ after the turning OFF of the sample-and-hold switch M12 and M13, and voltage change $V\phi_{RA}$ of the short-circuit control line $\phi RA$ after the turning OFF of the short-circuit switch M41 to M43 ($V\phi_{CL5}=V\phi_{SH2}=V\phi_{SH1}=V\phi_{RA}=V\phi_{CDS}$), noise $V\phi_{CSH1}$ due to feedthrough component occurring on the sample-and-hold line VSH1 and noise $VN\phi_{CSH2}$ due to feedthrough component occurring on the sample-and-hold line VSH2 are obtained as in the following expression.

$$VN\phi_{CSH1} = VN\phi_{CSH2}$$
$$= V\phi_{CDS}[C_P/(C_P+CCL)] - V\phi_{CDS}(C_P/CF) +$$
$$V\phi_{CDS}[C_P/(C_P+CSH)]$$

Accordingly, the level difference between the black reference level value of a reference potential read associated with light-shielded pixels and the black level value of effective pixel section can be eliminated at the noise suppressing circuit 4 by driving the sample-and-hold control line φSH2 to low level after attaining low level of the clamp control line φCL5. Further, a signal is amplified at the noise suppressing circuit 4 so that an effect of noise occurring at the later part of the noise suppressing circuit 4 can be suppressed so as to improve S/N. In addition, since amplification factor of the differential input amplification section can be set by clamping capacitor and feedback capacitor, a current consumption at the noise suppressing circuit 4 can be made smaller.

All of the above embodiments have been described with respect to the condition where the sample-and-hold line VSH1 is fixed to a clamp potential, i.e. the case where a potential read out with lacking an input of signal from light-shielded pixel is used as a reference potential.

If a reference potential is to be obtained with inputting signal from light-shielded pixel, it is read out in a similar manner as the effective pixel section. Also in such a case, the timings of clamp control line φCL and sample-and-hold control line φSH are similar to the above embodiments.

While the invention has been described by way of some specific embodiments with reference to the drawings as the above, the scope of specific construction according to the invention is not limited to these embodiments and various modifications in design are possible without departing from the spirit of the invention.

As has been described by way of the above embodiments, in the first aspect of the invention, without changing an order according to which a release of sampling by a first control signal and a release of setting of clamp potential by a second control signal are effected, the first and the second control signals are applied by a reference signal control section to a noise suppressing circuit so as to attain one or the other of a first condition where signal of light-shielded (reference) pixel is inputted and a second condition where an input of signal of light-shielded (reference) pixel is lacked. A first reference signal to be obtained in the first condition or a second reference signal to be obtained in the second condition is thereby generated as a signal corresponding to an optical black level. The signal difference due to the noise suppressing circuit overlapped on the first and second reference signals is thereby suppressed based on the release of sampling by the first control signal and the release of setting of clamp potential by the second control signal so that a similar advantage as that in using the first reference signal can be obtained even when the second reference signal is used as the optical black level.

In the second aspect, when the system is in the second condition, the order according to which the release of sampling by the first control signal and the release of setting of clamp potential by the second control signal are effected in relation to the timing at which signal of light-shielded (reference) pixel is inputted is set to be the same by the reference signal control section. A driving of the noise suppressing circuit thereby becomes possible in the condition where an input of signal of light-shielded (reference) pixel is lacked. For example, in the case where the release of sampling by the first control signal is set as the same to that at the time of reading of signal of light-receiving pixel (i.e. sharing of the first control signal), while the sampling is released by the first control signal after the timing at which signal of light-shielded (reference) pixel is inputted, the release of setting of clamp potential by the second control signal is effected in a similar manner also after the timing at which signal of light-receiving pixel is inputted so that condition of lacking an input of signal of light-shielded (reference) pixel can be achieved (refer to drive timing of FIG. 3).

According to the third aspect, the level difference between the black reference level value by a reference potential read and the black level value of effective pixel section can be suppressed by change of a timing of control signal for driving the noise suppressing circuit. Further, since a signal is amplified at the noise suppressing circuit, an effect of noise occurring at later part of the noise suppressing circuit can be suppressed so as to improve S/N.

According to the fourth aspect, the level difference between the black reference level value by a reference potential read and the black level value of effective pixel section can be suppressed by change of a timing of control signal for driving the noise suppressing circuit. Further, since a signal is amplified at the noise suppressing circuit, an effect of noise occurring at later part of the noise suppressing circuit can be suppressed so as to improve S/N. In addition, since an amplification factor of the amplification section can be set by clamp capacitor and feedback capacitor, a current consumption of the noise suppressing circuit can be made smaller.

According to the fifth aspect, the level difference between the black reference level value by a reference potential read and the black level value of effective pixel section can be suppressed by change of a timing of control signal for driving the noise suppressing circuit. Further, since a signal is amplified at the noise suppressing circuit, an effect of noise occurring at later part of the noise suppressing circuit can be suppressed so as to improve S/N. In addition, since an amplification factor of the inverting amplification section can be set by clamp capacitor and feedback capacitor, a current consumption of the noise suppressing circuit can be made smaller.

According to the sixth aspect, the level difference between the black reference level value by a reference potential read and the black level value of effective pixel section can be suppressed by change of a timing of control signal for driving the noise suppressing circuit. Further, since a signal is amplified at the noise suppressing circuit, an effect of noise occurring at later part of the noise suppressing circuit can be suppressed so as to improve S/N. In addition, since an amplification factor of the differential amplification section can be set by clamp capacitor and feedback capacitor, a current consumption of the noise suppressing circuit can be made smaller.

What is claimed is:

1. A solid-state imaging apparatus comprising:
    a pixel section where a plurality of pixels for effecting photoelectric conversion are two-dimensionally arranged, having an effective pixel section consisting of pixels for receiving object light and a reference pixel section consisting of pixels shielded from Light;
    a first scanning circuit for sequentially setting to said pixel section said pixels to be read out a signal;
    a noise suppressing circuit for suppressing noise components of signals from said pixels based on a first control signal associated with sampling and holding of signals from said pixels and a second control signal associated with setting of clamping potential that are applied at respective predetermined timings;

a second scanning circuit for sequentially reading signals of each pixel suppressed of said noise components; and a reference signal control section for applying said first and said second control signals to said noise suppressing circuit so that said reference signal control section is brought into one or the other of a first condition where signals of said pixels shielded from light are inputted and a second condition where inputting of signals of said pixels shielded from light is omitted without changing an order according to which a release of sampling by said first control signal and a release of setting of clamping potential by the second control signal are effected, causing a generation of a first reference signal obtained in said first condition or a second reference signal obtained in said second condition as a signal corresponding to an optical black level.

2. The solid-state imaging apparatus according to claim 1, wherein said reference signal control section in said second condition sets as the same the order according to which the release of sampling by said first control signal and the release of setting of clamping potential by said second control signal are effected in relation to a timing at which signals of said pixels shielded from light are inputted.

3. The solid-state imaging apparatus according to claim 2, wherein said noise suppressing circuit at least includes a clamping capacitor connected to each signal line connected to said pixels by a unit of a column of said pixel section, a clamp switch for setting a clamping potential to said clamping capacitor, a sample-and-hold capacitor, and a sample-and-hold switch for causing signals of said pixels after said noise suppression obtained by said clamping capacitor to be retained at said sample-and-hold capacitor, wherein said sample-and-hold switch is controlled by said first control signal and said clamp switch by said second control signal.

4. The solid-state imaging apparatus according to claim 2, wherein said noise suppressing section comprises a clamping capacitor for obtaining a signal output corresponding to a level difference from a signal level of said pixels at a second timing with setting as a reference a signal level of said pixels at a first timing at which said second control signal is applied, and an amplification section for outputting an inverting amplification signal or a non-inverting amplification signal of the signal output obtained at said clamping capacitor.

5. The solid-state imaging apparatus according to claim 2, wherein said noise suppressing section comprises a clamping capacitor for obtaining a signal output corresponding to a level difference from a signal level of said pixels at a second timing with setting as a reference a signal level of said pixels at a first timing at which said second control signal is applied, an inverting amplification section for outputting an inverting amplification signal of the signal output obtained at said clamping capacitor, a feedback capacitor electrically connected between an input and an output of said inverting amplification section, and a short-circuit switch for short-circuiting between the input and the output of said inverting amplification section, wherein said short-circuit switch is controlled by said second control signal.

6. The solid-state imaging apparatus according to claim 2, wherein said noise suppressing section comprises a clamping capacitor for obtaining a signal output corresponding to a level difference from a signal level of said pixels at a second timing with setting as a reference a signal level of said pixels at a first timing at which said second control signal is applied, a differential amplification section for amplifying and outputting in a non-inverting manner the signal output from said clamping capacitor applied to a non-inverting input terminal thereof, a feedback capacitor electrically connected between an inverting input terminal and an output terminal of said differential amplification section, an amplification capacitor connected between said inverting input terminal and a reference potential, a short-circuit switch for short-circuiting between said inverting input terminal and said output terminal, and a clamp switch for setting said non-inverting input terminal to a clamping potential, wherein said clamp switch is controlled by said second control signal, and said short-circuit switch is controlled by a control signal having a timing opened between the release of sampling by said first control signal and the release of setting of clamping potential by the second control signal.

* * * * *